United States Patent [19]

Murschall et al.

[11] Patent Number: 5,364,704
[45] Date of Patent: Nov. 15, 1994

[54] NONSEALABLE, MATT, HAZY, BIAXIALLY ORIENTED MULTILAYER POLYOLEFIN FILM, METHOD OF PRODUCING IT, AND ITS USE

[75] Inventors: Ursula Murschall, Nierstein; Angela Speith, Wiesbaden; Gunter Schloegl, Kelkheim, all of Germany

[73] Assignee: Hoechst Aktiengesellschaft, Frankfurt am Main, Germany

[21] Appl. No.: 963,551

[22] Filed: Oct. 20, 1992

[30] Foreign Application Priority Data

Oct. 24, 1991 [DE] Germany .............................. 4135097

[51] Int. Cl.⁵ .......................................... B32B 27/08
[52] U.S. Cl. ...................................... 428/516; 428/349
[58] Field of Search ................................ 428/516, 349

[56] References Cited

U.S. PATENT DOCUMENTS

| | | | |
|---|---|---|---|
| 4,211,811 | 7/1980 | Bordini et al. | 428/220 |
| 4,410,582 | 10/1983 | Tsunashima et al. | 428/212 |
| 4,578,316 | 3/1986 | Clauson et al. | 428/516 |
| 4,666,778 | 6/1987 | Hwo | 428/412 |
| 4,855,187 | 8/1989 | Osgood, Jr. et al. | 428/516 |

FOREIGN PATENT DOCUMENTS

| | | |
|---|---|---|
| 0008623 | 3/1980 | European Pat. Off. . |
| 0236945 | 9/1987 | European Pat. Off. . |
| 0367613 | 5/1990 | European Pat. Off. . |
| 2201407 | 9/1988 | United Kingdom . |

*Primary Examiner*—Edith Buffalow
*Attorney, Agent, or Firm*—Foley & Lardner

[57] ABSTRACT

A nonsealable, matt, hazy, biaxially oriented multilayer film comprising a base layer and at least one outer layer wherein the base layer contains a propylene polymer and the outer layer(s) contain(s) high-density polyethylene (HDPE) and a polypropylene polymer. The film has a haze value, measured in accordance with ASTM D 1003, of greater than 40. The film is useful, for example, in the production of laminates or as a backing film for an adhesive on coating.

24 Claims, No Drawings

NONSEALABLE, MATT, HAZY, BIAXIALLY ORIENTED MULTILAYER POLYOLEFIN FILM, METHOD OF PRODUCING IT, AND ITS USE

BACKGROUND OF THE INVENTION

1. Field of the Invention

The invention relates to a nonsealable, matt, hazy, biaxially oriented multilayer film comprising a base layer and at least one outer layer. The base layer essentially contains a propylene polymer. The outer layer essentially contains high-density polyethylene (HDPE) and polypropylene. At least one surface of the multilayer film is matt and hazy.

The invention furthermore relates to a method of producing the multilayer film and to methods for using the film.

1. Description of Related Art

U.S. Pat. No. 4,578,316 discloses a biaxially oriented multilayer polyolefin film whose base layer comprises a propylene homopolymer and whose outer layer comprises a blend of polypropylene and MDPE and/or HDPE, 2 to 60% of polyethylene preferably being contained. The polyolefin film has a low coefficient of friction combined with a readily wettable surface; however, this film has an excellent optical clarity.

WO 89/10839 describes multilayer polyolefin films having a base layer comprised of a polypropylene polymer and outer layers comprised either of HDPE, an ethylene/propylene copolymer or a polypropylene, the film being stretched under special temperature conditions. The film has a low coefficient of friction and a good wettability, but at the same time it also has a high gloss and a low haze.

SUMMARY OF THE INVENTION

An object of the present invention is to avoid the disadvantages of the known multilayer films. In particular, it is intended to provide a multilayer film which is remarkable for a high haze and low gloss, i.e., pronounced mattness, at least of one surface. In addition, the film is intended to have at least one outer layer having a rough surface.

It is another object of the present invention, to provide a film which preferably has a printable surface. It is also an object to provide a film having a high surface tension which is stable over long storage times and to provide a film having a low friction and, consequently, good running properties on fast-running packaging machines.

It is further an object of the present invention to provide a method for producing the above-described films.

In accomplishing the foregoing objectives, there has been provided, in accordance with one aspect of the present invention a non-sealable, matt, hazy, biaxially oriented multilayer film comprising a) a base layer containing a propylene polymer,
b) at least one outer layer containing two components (A) and (B),
   wherein component (A) is composed of a high density polyethylene (HDPE), and
   wherein component (B) is composed of a propylene polymer,
c) the film having a haze value, measured in accordance with ASTM D 1003, of greater than 40, and
d) the film having a gloss, as measured by ASTM D 523-78, of less than 35 at an angle of 85°.

In accordance with another aspect of the present invention there has been provided a method of producing a multilayer film as described above comprising the steps of a) coextruding the melts corresponding to the individual layers of the film through a flat-film die,
b) taking off the coextruded film via a takeoff roll whose temperature is preferably between 60° and 110° C. so as to cool and consolidate the coextruded film,
c) biaxially stretching the cooled film, preferably at a longitudinal stretching ratio of 4:1 to 7:1 and at a transverse stretching ratio of 8:1 to 10:1,
d) heat-setting the biaxially stretched film, and
e) optionally flame-treating or corona-treating one or both of the outer surface(s) of the film.

Further objects, features, and advantages of the present invention will become apparent from the detailed description of preferred embodiments that follows.

DETAILED DESCRIPTION OF THE PREFERRED EMBODIMENTS

The films according to the invention have the desired optical appearance, i.e., a matt and a high haze outer surface. In the context of the present invention, matt surfaces are understood as meaning, in particular, those surfaces which have a gloss value (measured in accordance with ASTM D 523-78) of less than 35 at an angle of 85°. Hazy films in the context of the invention are those having a haze value of greater than 40, measured in accordance with ASTM D 1003.

The base layer of the multilayer film according to the invention contains a propylene polymer and, optionally, admixed therewith various additives known in the art in their active amounts. Any known polymer containing propylene can be used as the propylene polymer. The base layer generally comprises at least 70% by weight of the propylene polymer, preferably at least 90% by weight and even more preferably 95 to 99% by weight of the propylene polymer. The propylene polymer generally contains at least 50%, preferably at least 90% by weight of propylene, with the remainder being any known comononers. The propylene polymer preferably has a melting point of 140° C. or higher, more preferably 150 to 170° C. Isotactic polypropylene having an n-heptane-soluble component of 6% by weight or less, copolymers of ethylene and propylene having an ethylene content of 5% by weight or less, and copolymers of propylene containing ($C-C_8$)-α-olefins having an e-olefin content of 5% by weight or less are preferred propylene polymers for the base layer; an isotactic homopolymer of propylene being particularly preferred. The propylene polymer of the base layer generally has a melt flow index of 0.5 g/10 min to 10 g/10 min, preferably 1.5 g/10 min to 4 g/10 min, at 230° C. and a force of 21.6N (DIN 53 735). The specified percentages by weight discussed above relate to the respective copolymer.

The multilayer film according to the invention comprises at least one outer layer. In a preferred embodiment, the multilayer film is three-layered and is provided with outer layers on both surfaces of the base layer. Optionally, suitable interlayers may be situated between the base layer and the outer layer(s).

The outer layer(s) disposed on the surface(s) of the base or interlayer essentially contain(s) two components A and B and, optionally, admixed therewith, conventional additives. The outer layers disposed on either side may be identical or different in their structure and their composition.

To achieve the desired optical properties of the film, the two components A and B are used as a blend. Surprisingly, this measure results in a film having high haze and low gloss. In the context of the present invention, a blend is an alloy-like combination of the individual components which can no longer be decomposed mechanically into the original constituents. A blend has properties like those of a homogeneous substance and can accordingly be characterized by suitable parameters.

The component A of the blend comprises a high-density polyethylene (HDPE) which generally has a melting range of 130° to 145° C. and a crystallinity of 40% to 80%. The high-density polyethylenes of the present invention have a density in the range from 0.910 to 0.970 g/cm$^3$. The viscosity number (measured in accordance with DIN 53 728, Part 4, in 0.1%-strength decahydronaphthalene solution at 135° C.) is generally in a range of 200 to 600 cm$^3$/g, preferably in the range from 200 to 400 cm$^3$/g. The viscosity average of the molecular mass $M_n$ (calculated in accordance with $VZ = 0.046 \cdot M_n^{0.73}$) generally is between 90,000 and 400,000 g/mol, preferably between 95,000 and 250,000 g/mol. The melt flow index is preferably in the range from 0.5 to 1.5 g/10 min (DIN 53 735 at 190° C.). The HDPEs used may be any known homopolymers, or copolymer with other monomers. Generally, the HDPE contains at least 96% of ethylene. Preferably, the HDPE is a copolymer of propylene with a small proportion of butylene, generally at most 4% by weight of butylene, preferably much less.

The component B of the blend comprises a propylene polymer. Any known polymer containing propylene can be used. The propylene generally contains at least 50%, preferably at least 90% by weight of propylene and generally has a melting point of 140° C. or higher, preferably 150° to 170° C. An isotactic homopolymer of propylene having an n-heptane-soluble component of 6% by weight or less is a preferred propylene polymer for the component B. The melt flow index of the propylene polymers used is generally between 0.5 g/10 min and 10 g/10 rain, preferably between 1.5 g/10 min and 4 g/10 min, at 230° C. and a load of 21.6N (DIN 53 735).

The haze values of the film are measured in accordance with ASTM D 1003 and are greater than 40, generally between 40 and 85, preferably between >60 and 80.

The gloss values of the film are measured in accordance with ASTM D 523-78 and are less than 35, generally less than 30, preferably between 25 and 10, all values measured at an angle of 85°.

The mean peak-to-valley heights, measured in accordance with DIN 4768, are over 1.0 μm, generally between 1 and 6 μm, preferably between 2.5 and 4.5 μm.

The mixing ratio (ratio by weight) of the two components A and B in the blend can be varied depending on intended use of the film, and is generally between A:B=20:80 and A:B=80:20, preferably between A:B=40:60 and A:B=60:40 and, in particular, is preferably A:B=45:55.

The blend of the components A and B generally has a melt flow index (DIN 53 735 at 230° C. with a load of 21.6N) of 1.5 g/10 min to 12 g/10 min, preferably of 2.5 g/10 min to 6 g/10 min, the melt flow index of the blend preferably being higher than that of the propylene polymer of the base layer.

The reduced specific viscosity (viscosity number) of the blend measured in line with DIN 53 728 Part 4, is generally between 1.5 and 3.5 dl/g, preferably between 2.0 and 3.0 dl/g. A blend having these parameters is available under the trade name DUL 3636 ® from the Schulman GmbH Company, Kerpen, Germany.

The cover layers generally comprise at least 70% by weight of said blend, preferably at least 90% by weight, even more preferably 95 to 99% by weight.

The thickness of the outer layer(s) can be varied within wide limits and generally is greater than 0.4 μm and is preferably in the range from 1.0 to 3 μm, it being possible for outer layers on either side to have the same or different thickness.

The total thickness of the multilayer polyolefin film according to the invention may vary within wide limits and depends on the intended use. It is generally 6 to 70 μm, preferably 10 to 50 μm, the base layer preferably forming about 50 to 80% of the total film thickness.

To improve the adhesive properties of one or both of the outer layers, the surfaces of the outer layer may be corona- or flame-treated, the treatment of one surface possibly being adequate for the intended use.

In order to improve certain properties of the polyolefin film according to the invention still further, both the base layer and the outer layer(s) may also contain further additives, including antistatics, anti-blocking agents, lubricants, stabilizers and/or neutralizing agents, in an active amount in each case. All the amounts specified in the following explanation in percent by weight (wt. %) relate in all cases to the layer or layers to which the additive is admixed.

Any known antistatics can be used. Preferred antistatics include alkali-metal alkanesulfonates, polyether-modified, i.e., ethoxylated and/or propoxylated polydiorganosiloxanes (polydialkylsiloxanes, polyalkylphenylsiloxanes and the like) and/or the essentially straight-chain and saturated aliphatic tertiary amines containing an aliphatic radical having 10 to 20 carbon atoms which are substituted with ω-hydroxy($C_1$–$C_4$)alkyl groups, N,N-bis(2-hydroxyethyl)alkylamines containing 10 to 20 carbon atoms, preferably 12 to 18 carbon atoms, in the alkyl radical being particularly suitable. The active amount of antistatic is generally in the range from 0.05 to 0.3 wt. %.

Any lubricants can be used such as higher aliphatic acid amides, higher aliphatic acid esters, waxes and metal soaps, and also polydimethylsiloxanes. The active amount of lubricant is generally in the range from 0.1 to 3 wt. %. Particularly suitable is the addition of higher aliphatic acid amides in the range from 0.10 to 0.35 wt. % in the base layer and/or the outer layers. A particularly suitable aliphatic acid amide is erucic amide. The addition of polydimethylsiloxanes as lubricants is preferred in the range from 0.3 to 2.0 wt. %, polydimethylsiloxanes having a viscosity of 10,000 to 1,000,000 mm$^2$/s being particularly preferred. Particularly beneficial is the addition of the polymethyldisiloxanes in one or both outer layer(s).

Any of the standard compounds having stabilizing action for ethylene, propylene and other α-olefin polymers may be used as stabilizers. The added amount thereof is generally between 0.05 and 2 wt. %. Particularly suitable are phenolic stabilizers, alkali-metal/alkaline-earth stearates and/or alkali metal/alkaline-earth carbonates. Phenolic stabilizers are preferred in an amount of 0.1 to 0.6 wt. %, in particular 0.15 to 0.3 wt. %, and having a molecular mass of more than 500 g/mol. Pentaethythrityl tetrakis-3(3,5-di-tert-butyl-4-hydroxyphenyl)propionate or 1,3,5-trimethyl-2,4,6-tris(3,5-di-tert-butyl-4-hydroxybenzyl)benzene are particularly advantageous.

As neutralizing agents, any such agents can be used, such as alkaline-earth stearates and carbonates. In particular, calcium stearate and/or calcium carbonate having a mean particle size of less than 0.1 mm, preferably 0.03 to 0.07 mm, an absolute particle size of less than 10 $\mu$m, preferably less than 5 $\mu$m, and a specific surface of less than 40 m$^2$/g, in an amount of 0.01 to 0.05 wt. % are preferred.

Any known anti-blocking agents can be used. Suitable anti-blocking agents include inorganic additives such as silicon dioxide, calcium carbonate, magnesium silicate, aluminum silicate, calcium phosphate and the like and/or incompatible organic polymers such as polyamides, polyesters, polycarbonates and the like, benzoguanamine/formaldehyde copolymers, silicon dioxide and calcium carbonate preferably being used. The active amount of anti-blocking agent is generally in the range of 0.1 to 2 wt. %, preferably 0.1 to 0.5 wt. %. The mean particle size is generally between 1 and 6 $\mu$m, in particular 2 and 5 $\mu$m, particles having a spherical shape, such as those described in EP-A-0 236 945 and DE-A-38 01 535, being particularly suitable. Preferably, the anti-blocking agents are added to the outer layers.

The multilayer films according to the present invention can be produced in any known manner. In particular, the coextrusion method, which is known per se, is preferably used. According to the present invention, a preferred process comprises coextruding the melts corresponding to the individual layers through a flat-film die, taking off the film obtained in this way for the purpose of consolidation, on one or more roll(s), which is/are preferably heated, then biaxially stretching (orienting) the film, heat-setting the biaxially stretched film and, optionally, corona-treating it at the surface layer intended for the corona treatment.

The biaxial stretching (orienting) may be carried out simultaneously or consecutively, the consecutive biaxial stretching, in which stretching is first carried out longitudinally (in the machine direction) and then transversely (perpendicular to the machine direction), is preferred.

As is usual in the coextrusion method, the polymer or the polymer blend of the individual layers are first compressed and liquified in an extruder, it being possible for any optionally admixed additives already to be contained in the polymer. The melts are then simultaneously pressed through a flat-film die (sheet die) and the extruded multilayer film is taken off on one or more, preferably heated, take-off rolls, in which process they are cooled and consolidated.

The film obtained in this way is then stretched longitudinally and transversely with respect to the extrusion direction, which results in an orientation of the molecule chains. In the longitudinal direction, 4:1 to 7:1 stretching is preferably carried out and in the transverse direction 8:1 to 10:1 stretching is preferably carried out. The longitudinal stretching will expediently be carried out with the aid of two rolls fast-running differently in accordance with the desired stretching ratio and the transverse stretching with the aid of a suitable tenter frame.

The biaxial stretching of the film is followed by its heat-setting (heat treatment), wherein the film is generally held at a temperature of 150° to 180° C. for about 0.5 to 10 s. The film is then wound up in the standard way using a winding-up device.

It has proven particularly beneficial to maintain the take-off roll or rolls, which cool(s) and consolidate(s) the extruded film, at a temperature of 60° to 110° C., which is higher than is conventionally used, by means of a heating/cooling circuit.

In addition, the biaxial stretching is also advantageously carried out at an increased film temperature, the longitudinal stretching preferably at 130° to 150° C. and the transverse stretching preferably at 165° to 190° C.

Optionally, as mentioned above, one or both surface(s) of the film can be corona- or flame-treated by one of the known methods after the biaxial stretching.

The corona treatment comprises passing the film between two conductor elements serving as electrodes, a voltage, generally an alternating voltage (about 10,000 V and 10,000 Hz) being applied between the electrodes which is so high that partial or corona discharges can take place. The partial or corona discharge ionizes the air above the film surface and the latter reacts with the molecules of the film surface, with the result that polar occlusions are produced in the essentially nonpolar polymer matrix. The treatment intensity is in the usual scope, 38 to 45 mN/m being preferred.

In the flame treatment, the film is passed over a cooling roll, above which a gas burner is disposed. The film is pressed fully against the cooling roll by a nip roll. The gas escaping from the burner is ignited and forms flames about 5 to 10 mm in size. In this process, the oxidizing part of the flame impinges on the film surface and ensures an increase in the surface energy of the film within the usual scope.

The multilayer film according to the invention is remarkable, in particular, in having a minimum gloss and maximum haze combined with a rough surface. Thus, in the determination of the properties of various embodiments, a haze value (in accordance with ASTM D 1003) of over 40 and a gloss (in accordance with ASTM D 523-78) with a measuring angle of, for example, 85° of less than 35 were measured, the mean peak-to-valley height (in accordance with DIN 4768) being over 1.0 $\mu$m.

Surprisingly, the multilayer films according to the invention have, in addition to their desired mattness and haze, an outstanding printability, which can be additionally improved by a flame or corona treatment of the outer layers, this printability being, surprisingly, particularly stable over a long time.

In addition, measurements (of the surface tension) show that the film according to the invention has a high surface tension which, unexpectedly, decreases only insignificantly even after a storage time of several months, resulting in a very good long-term further processability such as printing, metallizing, cladding.

In summary, it can be stated that the multilayer film according to the invention is remarkable for a multiplicity of advantageous properties, in particular for a very low gloss,
a matt surface,
a high haze,
a high mean surface peak-to-valley height,
a good short-term and long-term printability,
a high surface tension and a good long-term stability of the surface tension.

As a result of this surprising multiplicity of excellent properties, a film is provided which is equally and outstandingly suitable for various applications. One such application is as an effective matt cladding film for advertisement purposes. A minimum gloss and a high haze combined with a homogeneous matt surface is particularly important for this preferred application purpose. In addition, the film can be used excellently as a backing film for adhesive tapes, since the film is stable over a long time and has high surface tension, or as a backing film for aqueous barrier coating systems, for example, based on aqueous dispersions of polyvinylidene chloride or ethylenevinylalcohol copolymers.

For various purposes, it can be printed with aqueous printing inks and, in this connection, has an outstanding short-term and long-term printability. Because of its good immediate and long-term coatability, the film is also suitable for the production of laminates with paper, cardboard, metals, metallized plastic films and plastic films.

The invention is now explained in still greater detail by reference to exemplary embodiments.

EXAMPLE 1

A three-layer film 1 mm thick in total is extruded with a XZX layer structure, i.e., the base layer Z is surrounded by two identical outer layers X, by the coextrusion method from a sheet die at an extrusion temperature of 260° C.

The base layer comprises a propylene homopolymer having an n-heptane-soluble component of 4.5 wt. % and a melting point of 165° C. The melt flow index of the polypropylene homopolymer is 3.2 g/10 min at 230° C. with a loading of 21.6N (DIN 53 735).

The two outer layers X comprise a blend (available as DUL 3636, from Schulman GmbH, Kerpen, Germany) of two components A and B in a ratio of A:B=50:50, the blend having a melt flow index of 3.8 g/10 min. The component A is composed of an HDPE having a melting point of 134° C. The component B is composed of a propylene polymer.

All the layers contain 0.12 wt. % of pentaerythrityl tetrakis-4-(3,5-di-tert-butyl-4-hydroxyphenyl)propionate (Irganox 1010 ®) for the purpose of stabilization and 0.06 wt. % of calcium stearate as a neutralizing agent. The base layer furthermore contains 0.15 wt. % of N,N-bis(2-hydroxyethyl)($C_{10}$–$C_{20}$)alkylamine(Armostat 300 ®) as antistatic.

After coextrusion the extruded three-layer film is taken off by a first take-off roll and a further set of three rolls and cooled, then longitudinally stretched, transversely stretched, heat-set, corona-treated and wound up, the following conditions being chosen in particular:

| | |
|---|---|
| Extrusion: | Extrusion temperature 260° C. |
| | Temperature of the first take-off roll 90° C. |
| | Temperature of the set of three rolls 50° C. |
| Longitudinal stretching: | Stretching roll T = 137° C. |
| | Cooling rool T = 90° C. |
| | Longitudinal stretching by a factor of 5 |
| Transverse stretching: | Heating zone T = 180° C. |
| | Stretching zone T = 180° C. |
| | Transverse stretching by a factor of 10 |
| Heat setting: | Temperature T = 155° C. |
| Corona treatment: | Voltage: 10,000 V |
| | Frequency: 10,000 Hz |

The multilayer film produced in this way has a matt surface on either side and has a surface tension of 40 to 41 mN/m immediately after the production.

The film is approximately 21.5 μm thick, the base layer being 19 μm thick and each outer layer 1.25 μm thick.

EXAMPLE 2

Example 1 is repeated. The blend of the outer layers is composed of 60 wt. % of the HDPE and 40 wt. % of the polypropylene and has a melt flow index of 4.0 g/10 min (DIN 53 735).

EXAMPLE 3

Example 1 is repeated. However, the film is stretched at 185° C. by a factor of 10 in the transverse direction.

EXAMPLE 4

Example 1 is repeated. The temperature of the take-off roll is 100° C. The film is longitudinally stretched at 132° C. and transversely stretched at 180° C.

Comparison Example 1

Example 1 is repeated. The temperature of the take-off roll is 30° C. as in the standard biaxially oriented polypropylene (BOPP) multilayer film production.

Comparison example 2

Example 1 is repeated. The thickness of each of the outer layers is 0.4 μm.

Comparison Example 3

Example 1 is repeated. The outer layers are composed of a blend of 10 wt. % of the HDPE and 90 wt. % of the polypropylene. The melt flow index of the blend is 4.1 g/10 min (DIN 53 735).

Comparison Example 4

Example 1 is repeated. The temperature of the longitudinal stretching is 128° C.

Comparison Example 5

Example 1 is repeated. The temperature in the transverse stretching is 162° C.

Comparison Example 6

Example 1 of WO 89/10839 is reworked. Both surfaces are surface-treated as in Example 1.

The following methods of measurements were used to characterize the raw materials and the films:

Melt flow index

DIN 53 735 at 21.6N loading and 230° C. or 190° C. for HDPE.

Melting point

DSC measurement, maximum of melting curve, heating rate 20° C./min.

Haze

The haze of the film was measured in accordance with ASTM D 1003-52.

Gloss

The gloss was determined in accordance with DIN 67 530. The reflector value was measured as the optical characterizing value for the surface of a film. The angle of incidence was set at 60° or 85° in line with the standards ASTM D 523-78 and ISO 2813. A light ray is incident at the set angle of incidence on the flat test surface or is reflected or scattered by the latter. The light rays incident on the photoelectronic receiver are indicated as proportional electrical variables. The measured value is dimensionless and must be stated along with the angle of incidence.

Mean peak-to-valley height

The mean peak-to-valley height was determined according to DIN 4768.

Friction

The friction was determined according to DIN 53 375.

Surface tension

The surface tension was determined by means of the so-called ink method (DIN 53 364).

Printability

The corona-treated films were printed 14 days after their production (short-term assessment) and 6 months after their production (long-term assessment). The ink adhesion was assessed by means of an adhesive tape test. If it was not possible to peel off any ink by means of adhesive tape, the ink adhesion was assessed as good (++), if individual, small flakes were peeled off, the ink adhesion was assessed as moderate (±), and as poor (−) in the case of marked ink peeling.

Viscosity number

The viscosity number or reduced specific viscosity was determined in accordance with DIN 53 728, Part 4.

Density

The density was determined at 23° C. in accordance with ISO 1183 or DIN 53 479.

The properties of the polyolefin films of the examples and comparison examples are summarized in the table below. As the results show, the polyolefin films according to the invention are markedly superior to those of the comparative examples. Only the films according to the invention have the required high film haze and the low surface gloss, accompanied at the same time by a rough surface, and are consequently remarkable for their general-purpose use possibilities for various application purposes.

b) at least one outer layer containing a blend of two components (A) and (B),
wherein component (A) is composed of a high density polyethylene (HDPE), and
wherein component (B) is composed of a propylene homopolymer,
c) the film having a haze value, measured in accordance with ASTM D 1003, of greater than about 40, and
d) the film having a gloss, as measured by ASTM D 523-78, of less than about 35 at an angle of 85° C.

2. A multilayer film as claimed in claim 1, wherein the propylene polymer of the base layer comprises at least about 90% by weight of propylene.

3. A multilayer film as claimed in claim 2, wherein the propylene polymer of the base layer is an isotactic homopolymer of propylene having an n-heptane-soluble component of about 6% by weight.

4. A multilayer film as claimed in claim 1, wherein the propylene homopolymer of the outer layer is an isotactic homopolymer of propylene.

5. A multilayer film as claimed in claim 1, wherein the high-density polyethylene has a melting point in the range from about 130° to 145° C. and a viscosity from about 200 to 600 cm³/g.

6. A multilayer film as claimed in claim 1, wherein at least one of the base layer and the outer layer contains at least one additive selected from the group consisting of an antistatic agent, an anti-blocking agent, a lubricant, a stabilizer, and a neutralizing agent.

7. A multilayer film as claimed in claim 6, wherein at least one of the base and outer layer of the film contains a total amount of the additives in an amount of about 0.01 to 5% by weight, based on the respective layer.

8. A multilayer film as claimed in claim 1, wherein the weight ratio of the two components A and B in the outer layer is between about A:B=20:80 and about A:B=80:20.

9. A multilayer film as claimed in claim 8, wherein the weight ratio of the two components A and B is between about A:B=40:60 and about A:B=60:40.

10. A multilayer film as claimed in claim 1, wherein the melt flow index of the blend is higher than that of the propylene polymer of the base layer.

TABLE

| Examples and Comparison Examples | Gloss (ASTM D 52 378) measurement angle | | Haze (ASTM D 1003) | Mean peak-to-valley height (c.o. 0.25 mm) | Coefficient of friction | Surface tension after storage for six months | Visual assesment of the mattness |
|---|---|---|---|---|---|---|---|
| | 60* | 85* | % | μm | | mN/m | |
| B1 | 12 | 20 | 75 | 3.4 | 0.40 | 38 | + + |
| B2 | 15 | 28 | 70 | 2.8 | 0.40 | 37 | + + |
| B3 | 10 | 14 | 80 | 4.4 | 0.50 | 39 | + + |
| B4 | 13 | 21 | 76 | 3.5 | 0.40 | 38 | + + |
| Comparison Examples | | | | | | | |
| VB1 | | | The production of a BOPP film is not possible because of extreme contact defects (take-off temperature too low) | | | | |
| VB2 | 26 | 50 | 55 | 0.9 | 0.35 | 36 | — |
| VB3 | 50 | 110 | 10 | 0.5 | 0.40 | 33 | — |
| VB4 | 20 | 42 | 60 | 0.9 | 0.40 | 37 | — |
| VB5 | 25 | 55 | 50 | 0.8 | 0.35 | 38 | — |
| VB6 | 110 | —(*) | 1.7 | 0.4 | 0.32 | 38 | — |

(*)Too glossy to be measured at a measuring angle of 85*
B Example
VB Comparison example

What is claimed is:

1. A non-sealable, matt, hazy, biaxially oriented multilayer film comprising
a) a base layer containing a propylene polymer, 11. A multilayer film as claimed in claim 1, wherein the melt flow index of the propylene polymer of the base layer is between about 0.5 g/10 min and 10 g/10 min.

12. A multilayer film as claimed in claim 1, wherein the thickness of the outer layer is between about 0.4 and 3.0 μm.

13. A multilayer film as claimed in claim 1, having a total thickness between about 6 and 70 μm.

14. A multilayer film as claimed in claim 1, wherein the blend has a melt flow index from about of 1.5 to 12 g/10 min (DIN 52 735 at 230° C.).

15. A multilayer film as claimed in claim 1, wherein the surface of the outer layer has been flame or corona treated to improve the surfaces adhesion properties.

16. A multilayer film as claimed in claim 1, containing two of said outer layers, one on either side of said base layer.

17. A multilayer film as claimed in claim 1, which is produced by a method comprising the steps of
   a) coextruding melts corresponding to the individual layers of the film through a flat-film die,
   b) taking off the coextruded film via a takeoff roll so as to cool and consolidate the coextruded film,
   c) biaxially stretching the cooled film,
   d) heat-setting the biaxially stretched film, and
   e) optionally flame-treating or corona-treating one or both of the outer surface of the film.

18. A multilayer film as claimed in claim 17, wherein the takeoff roll is at a temperature between about 60° and 110° C. during step b) and where step c) comprises longitudinal stretching at a stretching ratio of about 4:1 to 7:1 and transverse stretching at a stretching ratio of about 8:1 to 10:1.

19. A multilayer film as claimed in claim 18, wherein the longitudinal stretching of the film is carried out at 130° to 150° C. and the transverse stretching at about 165° to 190° C.

20. A multilayer film as claimed in claim 1, further comprising an adhesive layer coated on the outer layer.

21. A multilayer film as claimed in claim 1, further comprising an aqueous barrier coating coated on the outer layer.

22. A multilayer film as claimed in claim 1, wherein the outer layer is printed.

23. A laminate comprising a multilayer film as claimed in claim 1.

24. A laminate comprising a multilayer film as claimed in claim 1, and one or more layer of paper, cardboard, metal, metallized plastic films, and other plastic films.

* * * * *